United States Patent [19]

Mori

[11] Patent Number: 4,732,443
[45] Date of Patent: Mar. 22, 1988

[54] LIGHT RADIATOR

[76] Inventor: Kei Mori, 3-16-3-501, Kaminoge, Setagaya-ku, Tokyo, Japan

[21] Appl. No.: 746,703

[22] Filed: Jun. 19, 1985

[30] Foreign Application Priority Data

Aug. 10, 1984 [JP] Japan .................. 59-168536

[51] Int. Cl.$^4$ .............. G02B 6/36; G02B 6/00; F21V 7/04; A01G 9/02
[52] U.S. Cl. .................. 350/96.10; 350/418; 350/96.20; 362/32; 47/DIG. 6
[58] Field of Search ........... 362/32; 350/96.10, 96.15, 350/96.16, 96.20, 321, 418; 47/DIG. 6, 1.4, 4, 5

[56] References Cited

U.S. PATENT DOCUMENTS

| | | | |
|---|---|---|---|
| 3,931,695 | 1/1976 | Widmayer | 47/DIG. 6 |
| 4,068,118 | 1/1978 | Carrington | 362/32 |
| 4,250,666 | 1/1981 | Rakestraw | 47/DIG. 6 |
| 4,255,897 | 3/1981 | Ruthner | 47/DIG. 6 |
| 4,286,839 | 9/1981 | Ilzig et al. | 350/96.24 |
| 4,505,260 | 3/1985 | Metzger | 350/418 X |

FOREIGN PATENT DOCUMENTS 0069977  1/1983  European Pat. Off. ............ 362/32

*Primary Examiner*—William L. Sikes
*Assistant Examiner*—Akm E. Ullah
*Attorney, Agent, or Firm*—Jordan and Hamburg

[57] ABSTRACT

Light radiator for diffusing and radiating light rays which have been transmitted through an optical cable comprises a transparent cylinder, an optical conductor for guiding light rays into the cylinder, an optical means movably accommodated in the cylinder for reflecting the light rays guided into the cylinder and radiating the light rays outside of it, and a driving means for moving the optical means along the axis of the cylinder. The driving means comprises optical oil in the cylinder and a liquid pump having one end communicating with one end of the cylinder and another end communicating with the other end of the cylinder. The liquid pump comprises a cylinder of a larger diameter than that of the cylinder, a piston plate partitioning the large-diametered cylinder and moving inside of it, and a moving device for moving the piston plate, wherein one end of the large-diametered cylinder communicates with one end of the cylinder and the other end of the large-diametered cylinder communicates with the other end of the cylinder.

14 Claims, 7 Drawing Figures

LIGHT RADIATOR

BACKGROUND OF THE INVENTION

The present invention relates to a light radiator for effectively diffusing and radiating light rays which have been transmitted through an optical cable or the like outside of the optical conductor cable.

The present application has previously proposed various ways to focus solar rays or artificial light rays by use of lenses or the like and to guide them into an optical conductor cable, and thereby to transmit them onto an optional desired place. The solar rays or artificial light rays transmitted and emitted in such a way are employed for the photo-synthesis process to promote the cultivation of plants and for use in illumination.

However, in the case of utilizing light energy for cultivating plants as mentioned above, the light rays transmitted through the optical conductor cable have directional characteristics. Supposing that the end portion of the optical conductor cable is cut off and the light rays are emitted threfrom, the radiation angle for the focused light rays is, in general, equal to approximately 46°. That is quite a narrow field. In the case of utilizing light energy as described above, it is impossible to obtain a desirable amount of illumination by simply cutting off the end portion of the optical conductor cable and by letting the light rays emit therefrom.

Therefore, the present applicant has already proposed various kinds of light radiators capable of effectively diffusing the light rays which have been transmitted through them and for radiating the same rays for illuminating a desired area. The present invention extends the idea and, in particular aims at applying intensified light rays to a desired place and to keep the light source at a distance to plants and to move the light source back and forth in order to supply light rays over a wider area.

SUMMARY OF THE INVENTION

It is an object of the present invention to provide a light radiator capable of effectively emitting solar rays or artificial light rays which were transmitted through an optical conductor cable outside the same for nurturing plants.

It is another object of the present invention to provide a light radiator capable of effectively moving the optical means installed in a transparent cylinder.

It is another object of the present invention to provide a light radiator including at least two cylinders arranged in parallel and an optical means accommodated in each cylinder to move opposite direction.

According to the present invention, since the respective movement of two optical means are opposite, it is possible to provide a light radiator capable of much more effectively diffusing and radiating light rays.

It is another object of the present invention to provide a light radiator capable of adjusting the movement stroke of the optical means in each cylinder, the light rays can be effectively radiated and supplied to an optional desired position by limiting them to a desired area.

The above-mentioned features and other advantages of the present invention will be apparent from the following detailed description which goes with the accompanying drawings.

DESCRIPTION OF THE PREFERRED EMBODIMENTS

Figure 1:
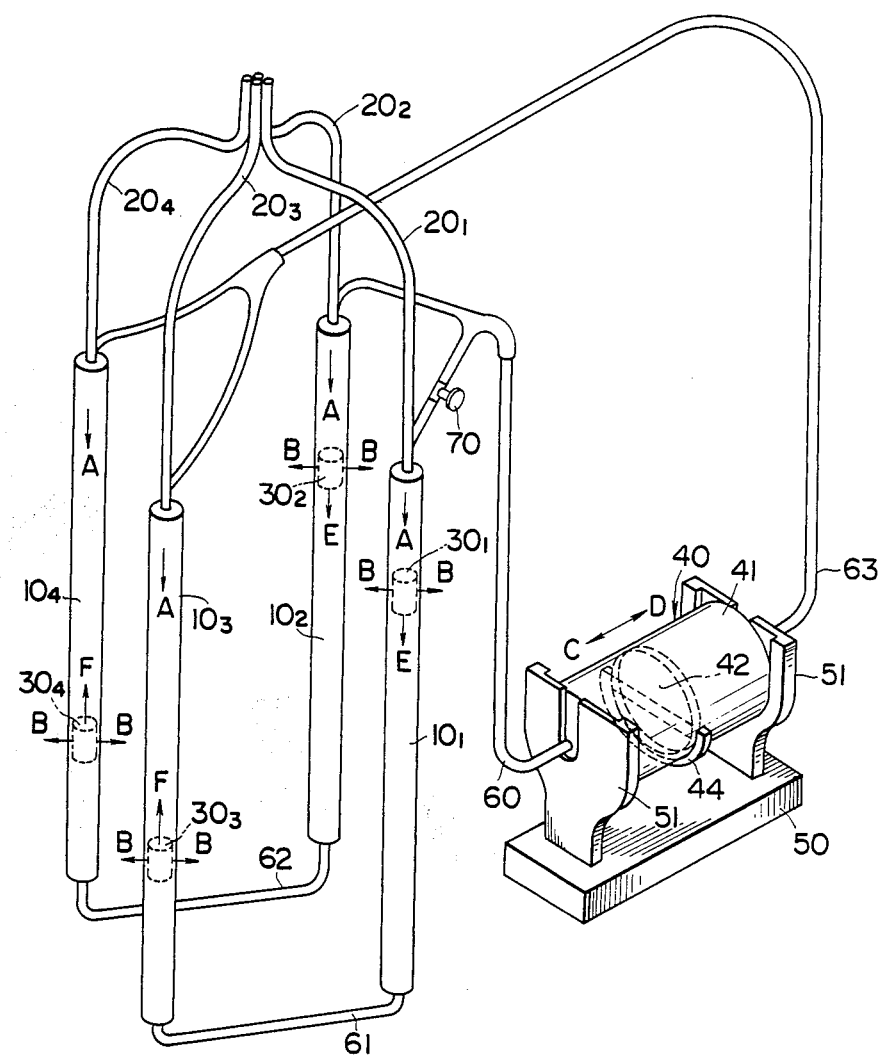
FIG. 1 is a construction view for explaining an embodiment of the present invention.

FIG. 1 is a cross-sectional view for explaining an embodiment of a light radiator according to the present invention. In FIG. 1, $10_1$ through $10_4$ are transparent cylinders, $20_1$ through $20_4$ are optical conductors $30_1$ through $30_4$ are optical means (light source means) which are movably installed in the respective cylinders, 40 a liquid pump, and 50 a foundation for carrying the liquid pump 40 thereon. Each of the cylinders is filled with optical oil.

The light rays transmitted through the conductors $20_1$ through $20_4$ are radiated into the repective cylinders $10_1$ through $10_4$ and propagate in a direction shown by an arrow A inside of the respective cylinders. In such a manner, the light rays radiated into the respective cylinders $10_1$ through $10_4$ impinge on the optical means $30_1$ through $30_4$ and are reflected by the same. Furthermore, the light rays are radiated in a direction shown by an arrow B from the respective cylinder and supply light (energy) to the neighboring plants. In addition, the afore-mentioned optical means are explained in detail in the Japanese patent application No. 117241/1984 and others previously proposed by the present applicant (inventor). Therefore any detailed explanation of the optical means is omitted here.

In the respective cylinders $10_1$ through $10_4$, the transmission of light rays is performed effectively. The cylinders are filled with optical oil in order to move the optical means therein. A differential pressure is applied between the front and rear portions of the respective optical means through the optical oil. The respective optical means $30_1$ through $30_4$, are moved by the action of the differential pressure.

Figure 2:
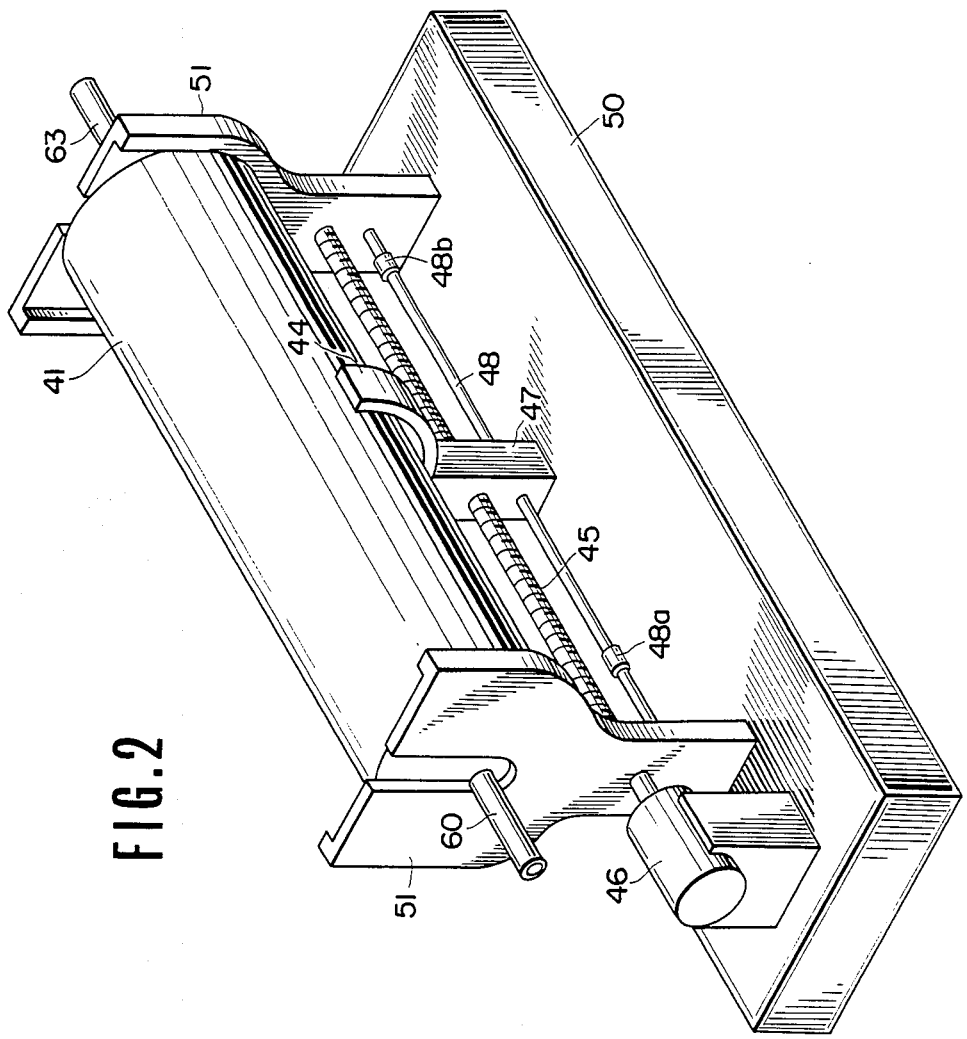
FIG. 2 is a perspective view for explaining an embodiment of the liquid pump 40 shown in FIG. 1.
Figure 3:
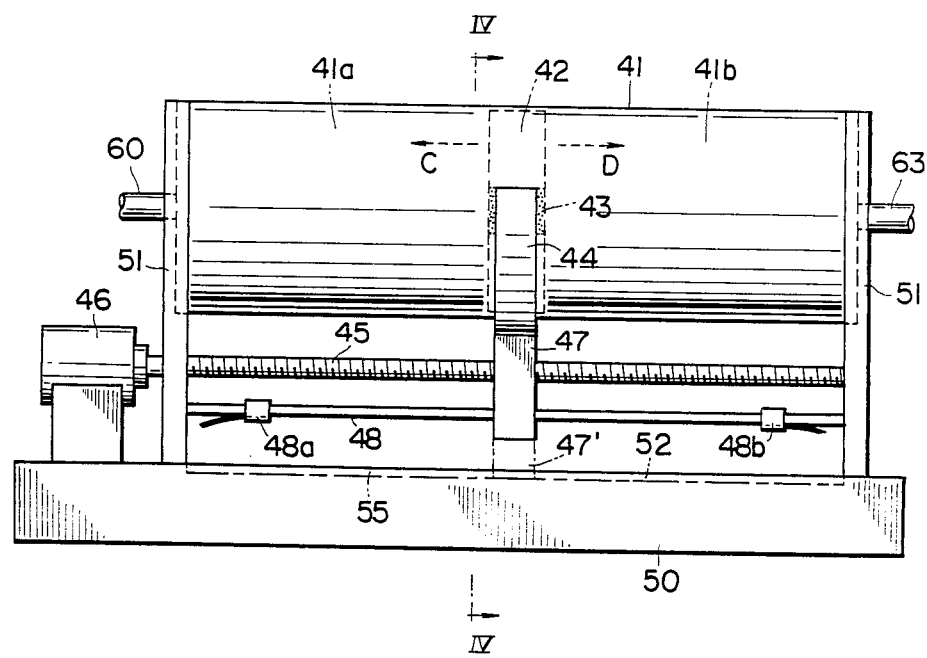
FIG. 3 is a front view of the liquid pump 40.
Figure 4:
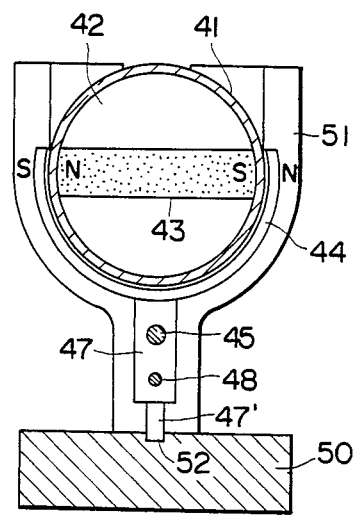
FIG. 4 is a cross-sectional view taken along the section line IV—IV of FIG. 3.

FIG. 2 is a perspective view showing an embodiment of the liquid pump. FIG. 3 is a front view. FIG. 4 is a cross-sectional view taken along the section line IV—IV of FIG. 3. In FIGS. 2 through 4, 41 is a large diametered cylinder having a considerably larger diameter than that of the cylinders $10_1$ through $10_4$, and 42 is a piston plate which partitions the internal space of the cylinder 41 and moves in a direction shown by an arrow C or D. When the piston plate 42 moves in the direction of C, the pressure in the chamber 41a rises and that in the chamber 41b gets lower. Thereby the optical oil flows out from the chamber 41a through a pipe 60 and the same flows in through a pipe 63 into the chamber 41b. As a result, the optical means $30_1$ and $30_2$ move in a direction shown by an arrow E and the other optical means $30_3$ and $30_4$ move in a direction shown by an arrow F. Namely, the optical means $30_1$ and $30_2$ and the other optical means $30_3$ and $30_4$ move in opposite direction to each other.

In such a manner, the optical means $30_1$ through $30_4$ move inside of the respective cylinders $10_1$ through $10_4$. However, in practice, the diameter of the cylinders $10_1$ through $10_4$ is not large and there is much resistance to the flow. If a large differential pressure is not applied to the respective optical means, those optical means cannot be moved smoothly.

For this reason, in the embodiment of the present invention, a piston cylinder type pump as shown in FIGS. 2 through 4 is utilized as a liquid pump 40. The inner diameter of the cylinder 41 or the diameter of the piston 42 are made considerably larger than the diameter of the cylinders $10_1$ through $10_4$, and the cross-sectional dimension of the piston 42 in the radial direction thereof is made larger than the total of the cross-sectional dimension of the cylinders $10_1$ through $10_4$. For this reason, according to the present invention, much pressure can be applied to the respective cylinders with little movement of the piston 42 and the optical means $30_1$ through $30_4$ can be moved smoothly inside of the respective cylinders $10_1$ through $10_4$.

A permanent magnet 43 is unitarily mounted on the piston 42. Another permanent magnet 44 is installed on the external side of the cylinder 41 opposite to the permanent magnet 43 so as to move in the directions shown by the arrows C and D. The cylinder 41 is kept liquid-proof thereby, and then movement of the piston 42 inside the cylinder 41 is made possible.

In the same figures, 45 is a rod screw, 46 is a motor for rotating the rod screw 45, 47 is a support arm for unitarily supporting the permanent magnet 43, 48 is a guiding rod for stopping the rotational movement of the support arm 47 and for guiding the support arm 47 so as to move it in directions C and D, and 51 is a pump supporting pillar set up on the foundation 50. When the motor 46 is driven, the rod screw 45 rotates and the permanent magnet 44 moves in the direction of C or D following the movement of the support arm 47. Consequently, the permanent magnet 43 moves, following the permanent magnet 44. In other words, the piston 42 moves following the same. When the piston 42 moves in direction C, as mentioned before, the optical oil contained in the cylinder 41 flows out through the pipe 60. As a result, the optical means $30_1$ and $30_2$ move in direction E and the other optical means $30_3$ and $30_4$ move in direction F. The respective optical means $30_1$ through $30_4$ radiate the light rays in direction B when they move.

On the contrary, when the revolution of the motor 46 is reversed, the piston 42 moves in the direction of D. At this time, the optical oil inside the cylinder 41 flows out through the pipe 63. Therefore, the optical means $30_1$ through $30_4$ move in a direction opposite to that mentioned above. The light rays are emitted at this time in the direction of B from the respective optical means $30_1$ through $30_4$.

The numerals 48a and 48b represent sensors regulating the movement stroke of the above-mentioned permanent magnet 44. When the permanent magnet 44 moves in the direction of C and arrives at the sensor 48a, the position of the permanent magnet 44 is detected and the revolutions of the motor 46 are reversed. At this time, the permanent magnet 44 moves in direction D. When the permanent magnet arrives at the sensor 48b, the position of the permanent magnet 44 is detected thereby and the revolutions of the motor 40 are reversed again and the permanent magnet 44 moves in direction C.

In such a manner, the movement of the permanent magnet 44 is reversed by the sensors 48a and 48b. The position of those sensors 48a and 48b can be adjusted to the movement of the permanent magnet 44. If the distance between those sensors 48a and 48b is narrowed, the movement area of the permanent magnet 44, that is, the piston 42 becomes narrow. Therefore, the movement area of the optical means $30_1$ through $30_4$ also becomes narrow. On the contrary, if the distance between the sensors 48a and 48b is enlarged, the movement area of the optical means $30_1$ through $30_4$ becomes wider. In such a manner, the movement area of the optical means $30_1$ through $30_4$ can be adjusted to create optimum use of the light radiator.

As described above, the optical oil flowing out from the pipe 60 enters the cylinders $10_1$ and $10_2$, and it flows out from those cylinders $10_1$ and $10_2$ while pushing the optical means $30_1$ and $30_2$ in those cylinders $10_1$ and $10_2$ in the direction of E. The optical oil flowing out from the cylinder $10_1$ enters the cylinder $10_3$ through the pipe 61, while the optical oil flowing out from the cylinder $10_2$ enters the cylinder $10_4$ through the pipe 62. As a result, the optical means $30_3$ and $30_4$ installed in those cylinders moves in direction F, and the optical oil circularly flows into the liquid pump 40 through the pipe.

Afterward, when the revolutions of the motor 46 are reversed, the circular-flow direction of the optical oil is also reversed and the optical means $30_1$, $30_2$ and the other optical means $30_3$, $30_4$ move in a direction opposite to that mentioned above.

As is apparent from the foregoing description, in the present invention, the cylinders $30_1$ and $30_2$ and the other cylinders $30_3$ and $30_4$ are arranged parallel to each other physically. Furthermore, those pairs of cylinders, connected in series, flow dynamically. The movement of the optical means $30_1$ (or $30_2$) in the cylinder $10_1$ (or $10_2$) and that of the optical means $30_3$ (or $30_4$) in the cylinder $10_3$ (or $10_4$) are always opposite to each other. Consequently the light sources can be effectively arranged in the case of needing a large number of movable light sources, etc. Since the movement direction of the light sources is different, the light rays can be diffused more effectively.

An example in which the cylinders $10_1$ and $10_2$ are provided for optical means $30_1$ and $30_2$ which are moving in direction E and the cylinders $10_3$ and $10_4$ are provided for optical means $30_3$ and $30_4$ moving in direction F, namely, two cylinders are provided for each one of the directions shown in FIG. 1. However, one or optionally plural cylinders can be provided for each direction. In the case of employing plural cylinders, the outflow ends and the inflow ends of the cylinders of the optical means moving in the same direction are commonly connected with each other. As shown in FIG. 1, the outflow ends of cylinders $10_1$ and $10_2$ are commonly connected and the inflow ends of the cylinders $10_3$ and $10_4$ are also commonly connected. Furthermore, the connection between the commonly connected portions can be done by use of a single pipe.

And further, in FIG. 1, 70 is a throttle valve installed at the inlet side (or the outlet side) of the cylinder $10_1$. If the flowdynamic resistance for the cylinder $10_1$ is changed by use of the throttle valve 70, the amount of the optical oil flowing into the cylinder $10_1$ is also changed so that the movement area of the optical means $30_1$ in the cylinder $10_1$ can be changed. For instance, supposing that the throttle valve 70 regulates the flowdynamic resistance of cylinder $10_1$ so as to set it to the valve twice as much as for cylinder $10_2$, the optical oil to be supplied to the cylinders $10_1$ and $10_2$ through the pipe 60 or 63 is distributed proportionally to those cylinders. On that occasion, the optical oil of half the amount of the cylinder $10_2$ is supplied to the cylinder $10_1$. As a result, the optical means $30_1$ in the cylinder $10_1$ moves in a range of half the distance compared with the optical means $30_2$ in the cylinder $10_2$.

As is the case shown in FIG. 1, the movement area of the optical means $30_3$ in the cylinder $10_3$ turns out to be narrow as a matter of course. However, the present invention is not limited to the embodiment shown in FIG. 1. On that occasion, only the cylinders $10_1$ and $10_2$ may be employed for constructing the flowing route by omitting cylinders $10_3$ and $10_4$. Furthermore, it may be possible to connect a desired number of cylinders in parallel with the cylinders $10_1$ and $10_2$, to add the throttle valve as mentioned before for each cylinder, and to regulate the movement area of the optical means per each cylinder. Furthermore, it may be possible to adjust the throttling degree of the throttle valve 70 by remote control as well as the distance between the sensors 48a and 48b, and so on. In such a manner, the remote controlled operation can be performed for all elements.

Figure 5:
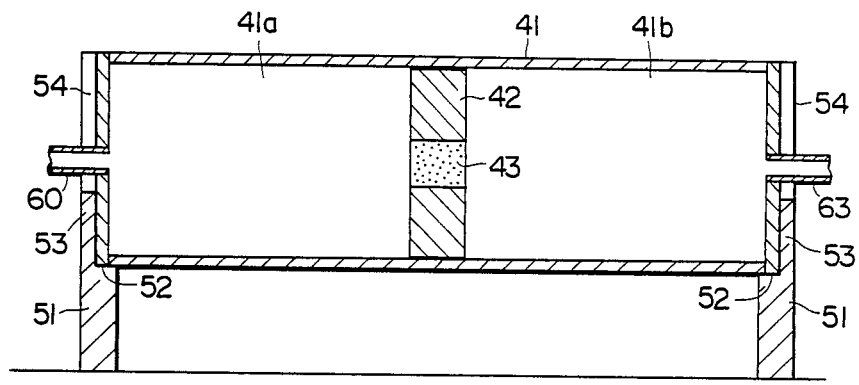
FIG. 5 is a cross-sectional view of the liquid pump portion and the supporting pillar portion.
Figure 6:
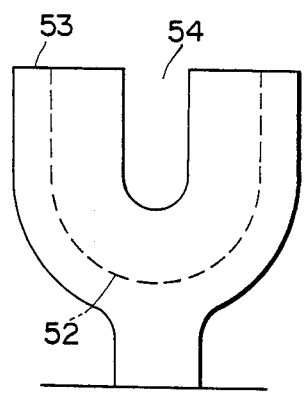
FIG. 6 is a front view of the supporting pillar.
Figure 7:
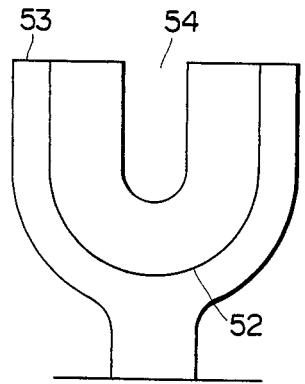
FIG. 7 is a back view of the supporting pillar.

FIG. 5 is a cross-sectional view of the liquid pump portion and its supporting pillar portion. FIG. 6 is a front view of the supporting pillar. FIG. 7 is a back view thereof. As shown in FIGS. 5 through 7, the supporting pillar 51 is comprised of an arched surface portion 52 for carrying the liquid pump 40, a side plate portion 53 for preventing the liquid pump 40 from moving in the direction of its axis, and a slit 54 for putting the pipes 60 and 63 therein at the time of carrying the liquid pump 40 on the arched surface 52 of the supporting pillar 51. Such a construction enables it to easily carry the liquid pump 40 on the supporting pillar 51 and to prevent the liquid pump 40 from moving in the directions C or D.

Namely, in the present invention, the optical oil in the cylinder 41 flows out or flows in when the piston 42 moves in the direction C or D. At that time, if the cylinder 41 is prevented from moving along the axis thereof, the cylinder 41 moves so that the optical oil cannot effectively flow out from the liquid pump. However, the construction of the supporting pillar 51 as shown in FIGS. 5 through 7 enables it to prevent the cylinder 41 from moving by use of a side plate portion 53. Then, since the side plate 53 has a slit 54 allowing the pipe 60 or 63 to pass therethrough, the cylinder 41 can be simply installed only by putting it on the supporting pillar 51 from an upper position.

The embodiment for employing a guiding rod 48 for preventing the permanent magnet 44 from moving has been described heretofore. However, as shown by the dot-and-dash line in FIGS. 3 and 4, a groove 55 is formed on the foundation 50 along the movement direction of the permanent magnet 44 and the lower end 47' of a supporting arm 47 for supporting the permanent magnet 44 can be allowed to be put on the groove 55 so that the lower end 47' thereof can move inside the groove.

As is apparent from the foregoing description, according to the present invention, it is possible to provide a light radiator capable of effectively moving the optical means installed in the transparent cylinder. And further, according to the present invention, since the respective movement of two optical means are opposite each other, it may be possible to provide a light radiator capable of much more effectively diffusing and radiating light rays. Furthermore, since the movement area of the optical means in each cylinder can be optionally adjusted, the light rays can be effectively radiated and supplied to an optional desired position by limiting them to a desired area. These are the merits of the present invention.

I claim:

1. A light radiator comprising a hollow transparent cylinder means, an optical conductor means for guiding light rays into said transparent cylinder means through one end of said transparent cylinder means, an optical means movably accommodated in said transparent cylinder means for reflecting said light rays guided into said transparent cylinder means from said optical conductor means and radiating said light rays outside of said transparent cylinder means, a pump means, said pump means comprising a pump cylinder means and a piston plate means partitioning said pump cylinder means and axially movable in said pump cylinder means, a first pipe means connected with one longitudinal end portion of said pump cylinder means and with one longitudinal end portion of said transparent cylinder means, a second pipe means connected with another longitudinal end portion of said pump cylinder means and with another longitudinal end portion of said transparent cylinder means, optical oil in said pump cylinder means, in said first and second pipe means and in said transparent cylinder means, said pump means further comprising magnetic means for moving said piston plate means in one axial direction in said pump cylinder means to move optical oil in said first pipe means in one direction and optical oil in said second pipe means in one direction to thereby move said optical means in said transparent cylinder means in one direction, said piston plate means being axially movable in said pump cylinder means in a second direction opposite to said one direction to move optical oil in said first pipe means in a second direction opposite to said one direction and to move optical oil in said second pipe means in a second direction opposite to said one direction to thereby move said optical means in said transparent cylinder means in a second direction opposite to said one direction.

2. A light radiator comprising a hollow transparent cylinder means, an optical conductor means for guiding light rays into said transparent cylinder means through one end of said transparent cylinder means, an optical means movably accommodated in said transparent cylinder means for reflecting said light rays into said transparent cylinder means from said optical conductor means and radiating said light rays outside of said transparent cylinder means, a drive means, first pipe means connected with said drive means and with one end portion of said transparent cylinder means, a second pipe means connected with said drive means and with another end portion of said transparent cylinder means, optical oil in said drive means, in said first and second pipe means and in said transparent cylinder means, said drive means comprising a pump cylinder means and a piston plate means partitioning said pump cylinder means and axially movable in said pump cylinder means, said drive means further comprising magnetic means for moving said piston plate means in one axial direction to move optical oil in said first pipe means in one direction and optical oil in said second pipe means in one direction to thereby move said optical means in said transparent cylinder means in one direction, said piston plate means being axially movable in said pump cylinder means in a second direction opposite to said one direction to move optical oil in said first pipe means in a second direction opposite to said one direction and to move optical oil in said second pipe means in a second direction opposite to said one direction to thereby move said optical means in said transparent cylinder means in a second direction opposite to said one direction.

3. A light radiator comprising a hollow transparent cylinder means, an optical conductor means for guiding light rays into said transparent cylinder means through one end of said transparent cylinder means, an optical means movably accommodated in said transparent cylinder means for reflecting said light rays guided into said transparent cylinder means from said optical conductor means and radiating said light rays outside of said transparent cylinder means, a drive means, first pipe means connected with said drive means and with one end portion of said transparent cylinder means, a second pipe means connected with said drive means and with another end portion of said transparent cylinder means, optical oil in said drive means, in said first and second pipe means and in said transparent cylinder means, said drive means comprising a pump cylinder means and a piston plate means partitioning said pump cylinder means and axially movable in said pump cylinder means, said pump cylinder means having a larger inner diameter than the inner diameter of said transparent cylinder means, said piston plate means being movable in one axial direction in said pump cylinder means to move optical oil in said first pipe means in one direction and optical oil in said second pipe means in one direction to thereby move said optical means in said transparent cylinder means in one direction, said piston means being axially movable in said pump cylinder means in a second direction opposite to said one direction to move optical oil in said first pipe means in a second direction opposite to said one direction and to move optical oil in said second pipe means in a second direction opposite to said one direction to thereby move said optical means in said transparent cylinder means in a second direction opposite to said one direction.

4. A light radiator according to claim 3 wherein said first pipe means is connected to one longitudinal end portion of said pump cylinder means and said second pipe means is connected to the other longitudinal end portion of said pump cylinder means.

5. A light radiator according to claim 3 wherein said piston plate means comprises a piston plate member and a first permanent magnet means, said drive means further comprising a second permanent magnet means disposed outside of said pump cylinder means, and movable means for moving said second permanent magnet means so that the movement of said second permanent magnet means moves said first magnet and said piston plate member parallel to the axis of said pump cylinder means.

6. A light radiator according to claim 5 wherein said drive means further comprises control means for controlling the movement of said second permanent magnet means.

7. A light radiator according to claim 6 wherein said control means comprises sensor means for regulating the stroke of said movable means.

8. A light radiator according to claim 5 wherein said second permanent magnet means comprises one part having a semicircular configuration, and a support arm extending from said one part.

9. A light radiator according to claim 8 wherein said movable means further comprises a rotatable part which engages said support arm to move said support arm in a direction parallel to the axis of said pump cylinder means.

10. A light radiator according to claim 9 wherein said drive means further comprises a foundation means having a groove, said support arm being guided in said groove as said support arm is moved by said rotatable part.

11. A light radiator according to claim 5 wherein said piston plate member has a cylindrical configuration having two sides, said first permanent means comprising elongated plates mounted on each of said two sides of said piston plate.

12. A light radiator according to claim 3 wherein said transparent cylinder means comprises a plurality of transparent cylinder members each accommodating an optical means, said first and second pipe means being connected to each end portion of each of said transparent cylinder members and to said drive means.

13. A light radiator according to claim 12 further comprising adjustable means in at least one of said pipe means leading to one of said transparent cylinder members for controlling the flow of optical oil in the respective pipe means to thereby control the movement of said optical means in said one transparent cylinder member.

14. A light radiator according to claim 12 wherein at least two of said transparent cylinder members are constructed to operate in parallel such that the respective optical means therein move in the same direction at the same time.

* * * * *